United States Patent [19]
Cremer

[11] Patent Number: 4,488,871
[45] Date of Patent: Dec. 18, 1984

[54] PROCESS FOR PRODUCING UNEVEN COLORING EFFECTS ON FIRING PLATE-LIKE CERAMIC MATERIAL

[75] Inventor: Gottfried Cremer, Cologne, Fed. Rep. of Germany

[73] Assignee: Buchtal GmbH, Fed. Rep. of Germany

[21] Appl. No.: 425,098

[22] PCT Filed: Feb. 11, 1982

[86] PCT No.: PCT/DE82/00028

§ 371 Date: Sep. 17, 1982

§ 102(e) Date: Sep. 17, 1982

[87] PCT Pub. No.: WO82/03072

PCT Pub. Date: Sep. 16, 1982

[30] Foreign Application Priority Data

Mar. 5, 1981 [DE] Fed. Rep. of Germany ....... 3108325

[51] Int. Cl.³ .................. F27D 7/00; F27B 9/04; F27B 3/22; F27B 5/04
[52] U.S. Cl. ...................................... 432/19; 432/23; 432/25; 432/26; 432/198
[58] Field of Search ............... 432/19, 23, 25, 26, 432/194, 198

[56] References Cited

U.S. PATENT DOCUMENTS

| | | | |
|---|---|---|---|
| 2,253,897 | 8/1941 | Doderer | 432/23 |
| 3,459,412 | 8/1969 | Fries et al. | 432/23 |
| 4,321,031 | 3/1982 | Woodgate | 432/23 |

FOREIGN PATENT DOCUMENTS

| | | | |
|---|---|---|---|
| 2634831 | 2/1978 | Fed. Rep. of Germany | 432/144 |
| 862035 | 3/1961 | United Kingdom | |
| 1595306 | 8/1981 | United Kingdom | |

*Primary Examiner*—John J. Camby
*Attorney, Agent, or Firm*—Price, Heneveld, Huizenga & Cooper

[57] ABSTRACT

For producing uneven coloring on firing plate-like ceramic material such as tiles or flags in a kiln, more specially a roller kiln, made up of preheating, firing and cooling zones, and through whose oxidizing atmosphere in the firing zone the material to be fired is moved in a single layer without burning tools for supporting it, in or at the end of the firing zone, in a screened-off part of the kiln, the material to be fired is acted upon by a partly reducing atmosphere. In this respect the material to be fired may be passed at this position through a reducing zone and then through a pulsating oxidation zone. It is however possible as well for the material to be fired to be moved through a reducing zone and then purposefully acted upon by blowing with a strongly oxidizing gas. A further possible way of undertaking the process is such that in or at the end of the firing zone the material to be fired is moved in a pulsating reducing zone. It is furthermore possible for the material to be fired to be acted upon by blowing against it with a reducing gas in or at the end of the firing zone.

20 Claims, 9 Drawing Figures

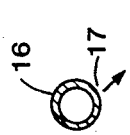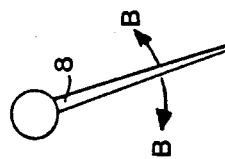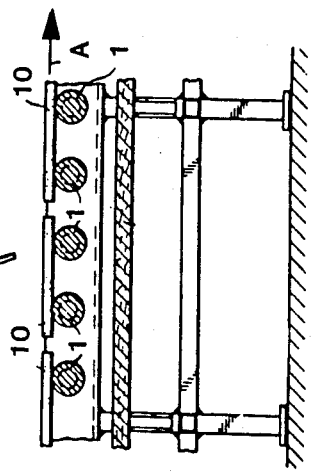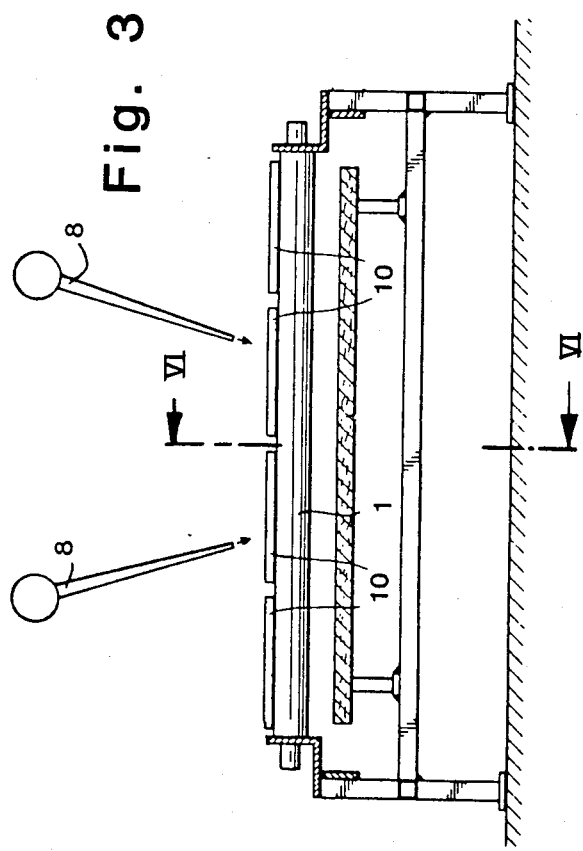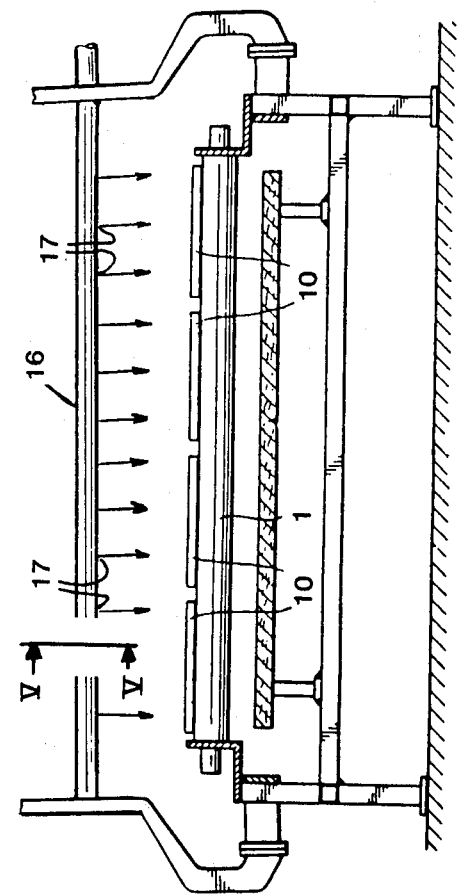

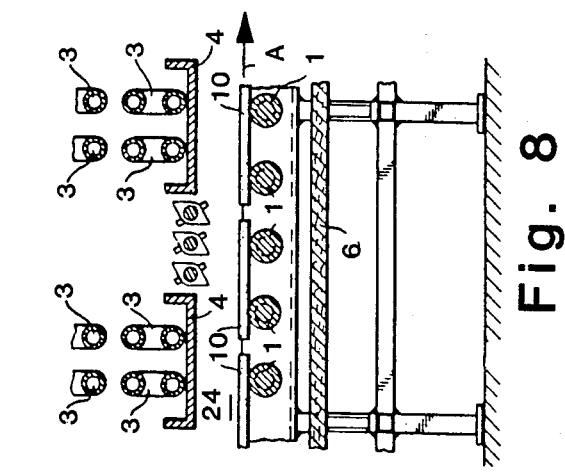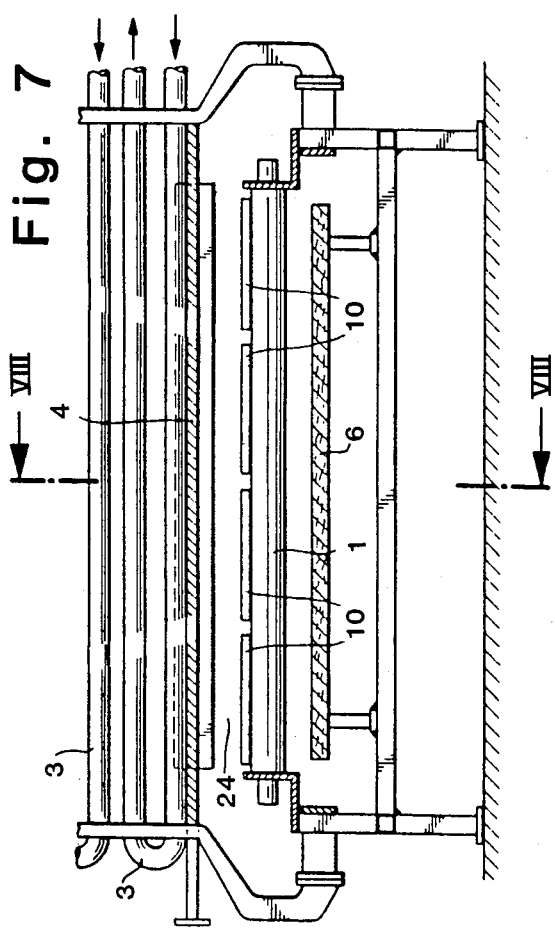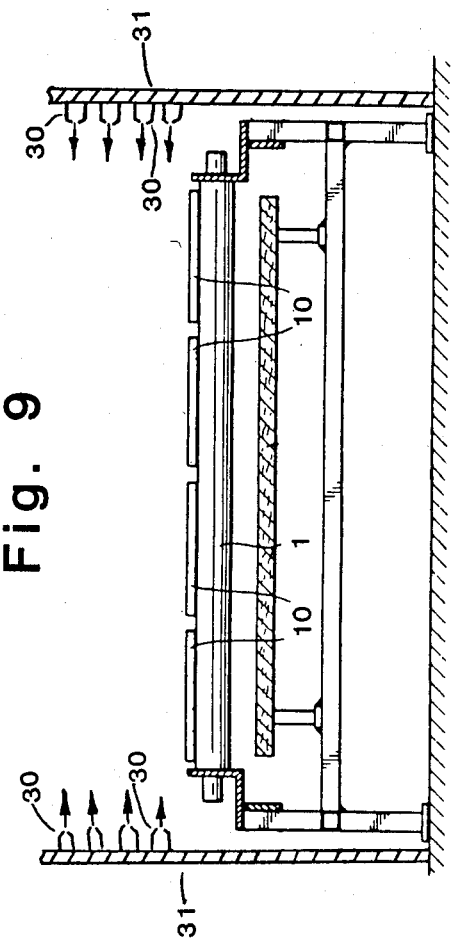

PROCESS FOR PRODUCING UNEVEN COLORING EFFECTS ON FIRING PLATE-LIKE CERAMIC MATERIAL

The invention is with respect to a process for producing uneven coloring effects on figure plate-like ceramic material, such as tiles or flags in a kiln, more specially a roller kiln, made up of a heating-up, a firing and a cooling zone, through whose atmosphere, which is oxidizing in the firing zone, the material to be fired is moved in a single layer without any burning tools for supporting it.

Such kilns, more specially in the form of roller kilns have come to be used of late in many parts of the ceramic industry on an ever increasing scale.

The useful effect of such kilns is that they make it possible to keep up a steady-enough temperature at every point in the kiln cross-section. Furthermore very much less fuel and manpower are needed for the operation of such kilns.

For firing plate-like ceramic material such kilns, in the form of roller kilns, are only run with an oxidizing effect, or, putting it differently, more oxygen is present in the kilns than is needed in theory, that is to say it is a question of operation with an oxygen excess. For this reason the fuel, for example gas or oil, used is completely combusted.

However because the kiln atmosphere has an important effect on the color produced on firing the material, it is sometimes important for the firing operation to take place in a reducing and not in an oxidizing atmosphere.

In the case of normal tunnel kilns, the tiles or the like are not moved through the kiln side by side in a single layer but are stacked on tunnel kiln carriages and are then moved in such stacks or parcels through the kiln so that, automatically, on burning in a reducing atmosphere the reducing effect will not be equally strong on all tiles or the like. In fact the tiles inside such a stack will undergo less reduction than the tiles or the like at the edge thereof where the reducing atmosphere may have a more lasting effect on the tiles. For this reason there is a certain uneven coloring effect, produced at the same time, on the tiles inside and outside, which will be seen after firing is completed so that by mixing the tiles on a face covered therewith a coloring effect may be produced.

This teaching may however not be made use of in kilns in which the material to be fired is run through the kiln in a single layer without any burning tools for supporting it. In fact, if in such a kiln the tiles were to be transported therethrough in a single layer side by side and then be reduced in the normally used way, all the tiles would be necessarily reduced to the same degree and for this reason would all have quite the same color, that is to say there would be no uneven coloring effect produced at the same time as desired. The tiles would all be plain and of the same color, this only being desired in a very small number of cases.

In the German Offenlengungsschrift specification No. 2,824,367 reducing gases, for example hydrogen, were to be supplied into kilns intermittently and under a high pressure. However the purpose in this case was burning structures, more specially made of porcelain, which were to be evenly reduced.

One purpose of the invention is that of making it possible for material fired in kilns, more specially roller kilns, through which the material is moved without any burning tools supporting it and in a single layer, so that the material has the desired uneven coloring effect.

This purpose is effected in the present invention insafar as in or at the end of the firing zone, in a screened-off part, the material to be fired is acted upon by a partly reducing atmosphere.

These purposes can best be understood with reference to the appended drawings, a brief description of which is as follows:

FIG. 3 is a cross section taken along the plane of line III—III of FIG. 2;

FIG. 4 is a cross-sectional view taken generally along the same plane as FIG. 3 illustrating an alternate gas injection means;

FIG. 5 is a cross section taken along the plane V—V of FIG. 4;

FIG. 6 is a cross section taken along the plane of line VI—VI of FIG. 3;

FIG. 7 is a cross section taken along the plane of line VII—VII of FIG. 1;

FIG. 8 is a cross section taken along the plane of line VIII—VIII of FIG. 7; and FIG. 9 is a cross section taken generally along the same plane as FIG. 3 illustrating an alternative nozzle arrangement.

Figure 1:
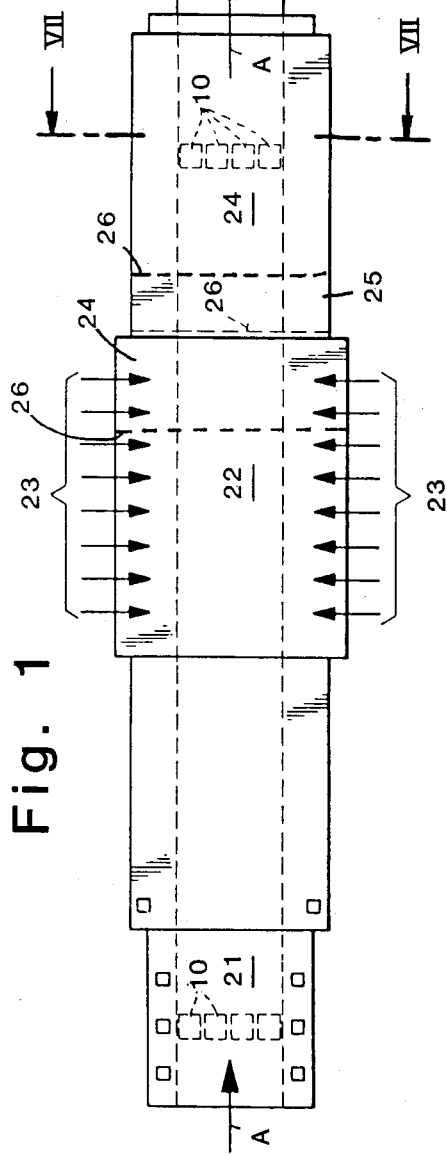
FIG. 1 is a diagrammatic plan view of a first embodiment of the kiln of the present invention.

There are generally speaking two possible way of running the process. In the case (FIG. 1) of one possible way the material to be fired 10 is moved in or at the end of the firing zone 22 through a reduction zone 24 and then through a pulsating oxidation zone 25 on rollers 1. A changed form of this form of the process is one in which, after the material to be fired has been moved through the reducing zone, a strongly oxidizing gas is purposefully directed onto the material to be fired.

In a second possible way of undertaking the process of the invention (FIG. 2), the material to be fired is moved through a pulsating reducing zone 24 in or at the end of the firing zone on rollers 1. In this case as well there is a further possible changed form inasfar as the material to be fired may have a reducing gas directed against it purposefully in or at the end of the firing zone.

In the first case, in which the firing zone 22 has a reducing zone 24 next to it, on coming out of which the material fired has an undesired plain or single-colored outer face, there is then a reoxidation zone 25, which however is only to be responsible for a reoxidation in part of the material to be fired so that the outer face of the tile will have not only reducing but furthermore oxidizing colors and, for this reason, the desired uneven coloring effect is produced. This reoxidation in part may be produced by pulsating the atmosphere in this zone or by directing a highly oxidizing gas against the material to be fired.

In the second case, in or at the end of the firing zone a reduction in part of the outer face of the material to be fired is produced.

While in the first case reduction is not to take place, in this case reoxidation is to be stopped as far as possible from which it may be seen that in the two cases the operation has to be undertaken in a screened-off part of the kiln wherein a reactive gas is pulsatingly introduced.

Figure 2:
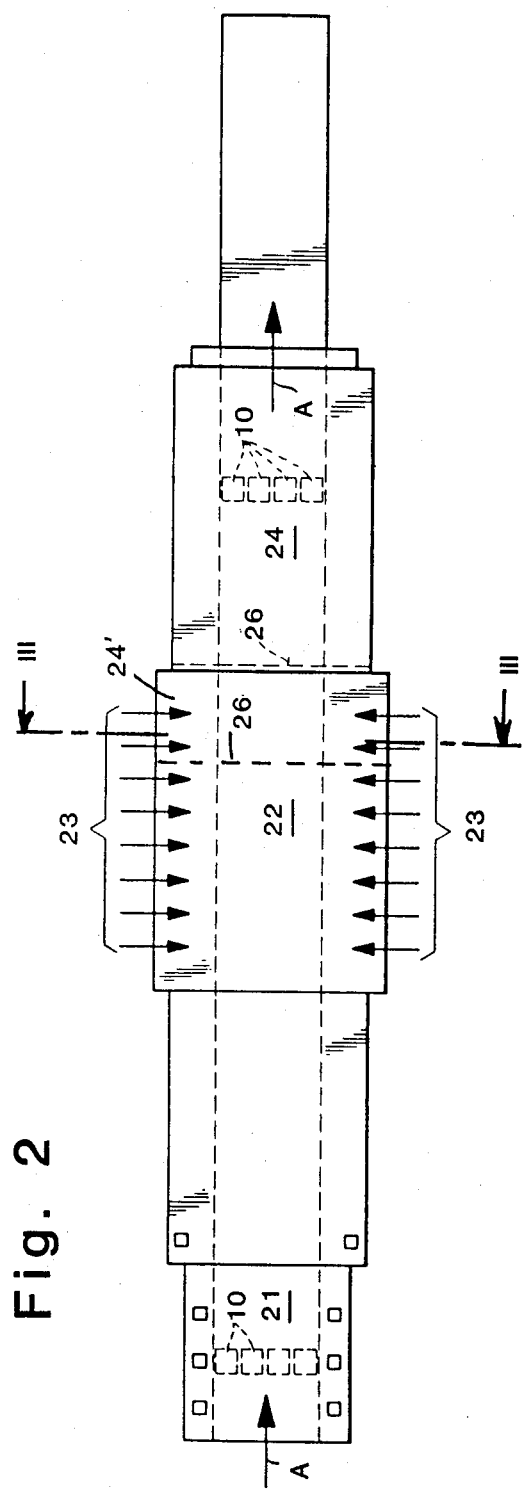
FIG. 2 is a diagrammatic plan view of a second embodiment of the kiln of the present invention.

A kiln which may be used for running the process has, in a normal way, a heating up 21, a firing 22 and a cooling zone 24 (FIGS. 1 and 2). In or at the end of the firing zone 22 there is a kiln part which is more or less completely sealed off mechanically, in which the material to be fired 10 is acted upon by nozzles 8 or 16 (FIGS. 3 and 4) directed towards it. Such nozzles may be small tubes 8 of refractory material for directing a jet downwards onto the face of the material to be fired, the same moving past under such jet. It is however furthermore possible to have nozzles in the form of openings 17 in tubes 1 running across the full breadth of the kiln space in a direction normal to the direction of transport through the kiln. It is naturally furthermore possible for the openings to have nozzle tips or the like.

As part of a further possible form of the invention, the nozzles 8 (or the tubes supporting them) may be hangingly supported for rocking backwards and forwards as shown by arrows B (FIG. 6), so that, on causing such rocking, the angle between the nozzles and the material to be fired being transported underneath them is changed. Using this design it is furthermore possible for the desired uneven coloring to be produced to a greater or lesser degree.

A more specially useful effect is produced if, as part of a further development of the invention, the blowing nozzles come to an end right over the material to be fired, this making certain that no undesired jets are produced which might have an undesired effect on the control of the uneven coloring by the nozzles.

As part of a further possible form of the invention the blowing nozzles 30 (FIG. 9) may be placed to the side in the kiln walls 31 and in this case the jet of the oxidizing or reducing gas will be brushed or swept over the full cross-section of the kiln. If these nozzles 30 are put into operation at certain times with a pulsating effect, the desired uneven coloring will be produced for this reason as well.

The walling off of the processing space in or at the end of the firing zone is best undertaken by screens 26 in the form of aprons of refractory fiber material shutting off the space inside the kiln to such a degree that the material to be fired only has enough room (and no more) for being moved through the narrow space which is still free. In the case of roller kilns there will furthermore be a space under the rollers 1 which then naturally will have to be shut off in the same way.

If reoxidation in the cooling zone is not to take place, it is not possible to have crash cooling in this part of the kiln, as is normally the case with roller kilns, because otherwise an an excess of air would be produced, which is not to be allowed to take place. In this case cooling in the cooling zone 24 is by way of water, that is to say using cooling coils 3 (FIGS. 7 and 8) placed over and, possibly, under the bed of rollers 1, it being best in this case for an inert gas to be directed into the cooling zone separated off from the rest of the space of the kiln by aprons.

I claim:

1. A process for producing uneven coloring on plate-like ceramic products in a kiln having heating, firing and cooling zones including the steps of transporting the products through the kiln in a flat, single layer; firing the products in the firing zone; screening off a portion of the kiln where the products are at firing temperature; pulsatingly injecting a reactive gas into the screened-off portion while transporting the products therethrough, whereby said gas reacts with the products creating a variety of coloring effects on the products due to variation in the concentration of the gas in the screened-off portion.

2. A process as claimed in claim 1, which further includes the steps of: providing the firing zone with an oxidizing atmosphere: providing a portion of said kiln following said firing zone with a reducing atmosphere; positioning said screened-off part following said reducing atmosphere portion and wherein said reactive gas is an oxidizing gas, whereby said ceramic materials are fired and oxidized in said firing zone, reduced in said reducing atmosphere portion, and special coloring effects are achieved by said pulsated oxidizing gas oxidizing some of said materials to a greater degree than others of said materials.

3. A process as claimed in claim 2, wherein said pulsating oxidizing gas is strongly oxidizing and is directed against said ceramic material.

4. A process as claimed in claim 1 wherein said reactive gas is a reducing gas pulsatingly introduced into said screened-off part.

5. A process as claimed in claim 4, which includes the further step of directing said pulsating reducing gas against said ceramic material.

6. The process as recited in claim 1 including the further step of transporting said tiles through said kiln on rollers.

7. A kiln as claimed in 6, wherein the nozzles are placed so that they may be rocked backwards and forwards.

8. The process as recited in claim 1 wherein the products are transported through said kiln on means which remain stationary with respect to the zone in which it is located.

9. The process as recited in claim 8 wherein said products are transported through said kiln on rollers.

10. A process for producing uneven coloring effects on plate-like ceramic materials in a kiln having heating, firing and cooling zones, including the steps of:
transporting said materials in a single layer through said kiln;
firing said materials in the firing zone as the materials are being transported therethrough;
providing gas discharge nozzles in said firing zone;
moving said nozzles with respect to said materials and simultaneously injecting a reactive gas through said nozzles.

11. The process as recited in claim 10 wherein the products are transported through said kiln on means which remain stationary with respect to the zone in which it is located.

12. The process as recited in claim 11 including the further step of transporting the products through said kiln on rollers.

13. A process for producing uneven coloring effects on plate-like ceramic materials in a kiln having heating, firing and cooling zones, including the steps of:
transporting said materials in a single layer through said kiln;
firing said materials in said firing zone;
providing gas discharge nozzles in said firing zone and directing the discharge of said nozzles toward said materials;
pulsatingly injecting a reactive gas through said nozzles against said materials while the materials are at firing temperature for creating the coloring effects.

14. A process for producing uneven coloring effects on plate-like ceramic products in a kiln having heating, firing and cooling zones, including the steps of: transporting said products in a single layer through said kiln; firing said products in said firing zone as they are being transported therethrough; providing gas discharge nozzles in a region of said kiln where said products are at a firing temperature; pulsatingly injecting a reactive gas through said nozzles against said products when said products are at a firing temperature; swinging said nozzles back and forth above said products as said reactive gas is being injected therethrough whereby said gas reacts with the products and creates a variety of coloring effects on the products due to variations in the concentration of the gas caused by the swinging of the nozzles and the pulsating injection of said gas.

15. The process as recited in claim 14 including the further step of transporting the products through said kiln on rollers.

16. A kiln for producing uneven coloring effects on plate-like ceramic materials, of the type having heating, firing and cooling zones comprising: means for transporting said ceramic materials through said kiln, said means remaining in the zone in which it is located as said materials are being transported therethrough; a screened-off part in or at the end of said firing zone into which a reactive gas can be pulsatingly introduced as said ceramic materials are transported through said screened-off part on said rollers; nozzles located in said sealed-off part for introducing a reactive gas in a pulsating fashion; and means for adjusting the direction of said nozzles in relation to the material to be fired whereby said reactive gas can react with said ceramic materials to produce coloring effects thereon, uneven coloring effects being achieved by the varying reactive characteristics of the atmosphere in said screened-off part due to the pulsating fashion in which said reactive gas can be introduced.

17. A kiln as claimed in claim 16 wherein the nozzles comprise tubes having a plurality of longitudinally spaced holes therein, said tubes stretching across the full breadth of the kiln space in a direction normal to the direction of transport of the material to be fired.

18. A kiln as claimed in 16, wherein the nozzles come to an end right over the material to be fired.

19. A kiln as claimed in claim 16, wherein the nozzles can be placed at the side in the kiln wall and are run periodically with a pulsating effect.

20. A kiln as claimed in claim 19 which further comprises means for indirectly cooling said cooling zone with a liquid heat absorbing medium.

* * * * *